(12) United States Patent
Poulakis

(10) Patent No.: US 8,709,323 B2
(45) Date of Patent: Apr. 29, 2014

(54) METHOD FOR PRODUCING AN ADHESIVE FASTENING ELEMENT MADE OF PLASTIC

(75) Inventor: Konstantinos Poulakis, Hildrizhausen (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 622 days.

(21) Appl. No.: 12/449,875

(22) PCT Filed: Apr. 9, 2008

(86) PCT No.: PCT/EP2008/002786
§ 371 (c)(1),
(2), (4) Date: Sep. 1, 2009

(87) PCT Pub. No.: WO2008/125253
PCT Pub. Date: Oct. 23, 2008

(65) Prior Publication Data
US 2010/0084790 A1 Apr. 8, 2010

(30) Foreign Application Priority Data
Apr. 11, 2007 (DE) .......................... 10 2007 017 128

(51) Int. Cl.
*B29C 33/52* (2006.01)
*B29C 39/00* (2006.01)
*B29C 41/00* (2006.01)

(52) U.S. Cl.
USPC ........... 264/299; 264/316; 264/317; 425/412; 425/394; 425/403

(58) Field of Classification Search
None
See application file for complete search history.

(56) References Cited

U.S. PATENT DOCUMENTS

| | | | |
|---|---|---|---|
| 5,614,232 A * | 3/1997 | Torigoe et al. | 425/545 |
| 5,785,784 A | 7/1998 | Chesley et al. | |
| 6,180,205 B1 | 1/2001 | Tachauer et al. | |
| 6,287,665 B1 * | 9/2001 | Hammer | 428/100 |
| 6,429,257 B1 * | 8/2002 | Buxton et al. | 524/788 |
| 6,432,339 B1 * | 8/2002 | Jens et al. | 264/167 |
| 2006/0220271 A1 | 10/2006 | Jackson et al. | |
| 2006/0249886 A1 * | 11/2006 | Chao et al. | 264/496 |

FOREIGN PATENT DOCUMENTS

| | | |
|---|---|---|
| DE | 693 11 107 T2 | 1/1998 |
| DE | 699 22 264 T2 | 3/2006 |
| EP | 1 759 607 A1 | 3/2007 |
| JP | 57 110420 A | 7/1982 |
| WO | WO 00/50208 A2 | 8/2000 |
| WO | WO 2006/099000 A2 | 9/2006 |

* cited by examiner

*Primary Examiner* — Benjamin Schiffman
(74) *Attorney, Agent, or Firm* — Roylance, Abrams, Berdo & Goodman LLP

(57) ABSTRACT

A method for producing an adhesive fastening element made of plastic includes a support part (10) from which project a plurality of stem parts (12). A head part (14) is arranged at each stem part opposing the support part (10) and the head parts (14) are formed without the use of molding tools due to the surface tension of the used plastic material. Consequently, no need exists for a specific molding tool for forming the head parts.

18 Claims, 2 Drawing Sheets

METHOD FOR PRODUCING AN ADHESIVE FASTENING ELEMENT MADE OF PLASTIC

FIELD OF THE INVENTION

The invention relates to a method for producing an adhesive fastening element made of plastic having a support part from which a plurality of stem parts projects. On each stem part end opposite the support part, one head is formed. For molding the stem parts a molding tool is used, extends between the support part and the head parts and is removed after molding the stem parts in a mold removal process. The invention relates furthermore to a device for carrying out that method.

BACKGROUND OF THE INVENTION

Such touch fastener elements also include mechanical fastening elements with touch fastener elements made in a complementary manner to form a fastener which can be repeatedly opened and closed. Hooks or mushroom-like fastener elements interact with loop-like fastener elements of another touch fastener element forming of a touch fastener. Solutions are also known in which the same touch fastener elements of two different touch fastener elements interact with one another (hermaphroditic fastener).

DE 699 22 264 T2 discloses supplying a belt-like support part with a plurality of projecting stem parts to a molding gap between heatable molding rolls. Into that gap by an extrusion means, an additional molding belt of plastic material can be supplied as the actual molding tool with mold recesses shapes. The hot stem ends of the stem parts are molded into head parts to obtain a mushroom-like touch fastener element. Since the head parts are formed from the plastic material of the stem parts, the head parts are of smaller dimension due to low material charging in the free and therefore projecting head surface available for interlocking. This limitation can adversely affect the required adhesion forces.

Conversely, U.S. Pat. No. 6,180,205 B1 proposes a production method using a molding roll in which a belt-like support part can be connected to a plurality on touch fastener elements dimensionable to be relatively large. For this purpose, the molding roll on its outer periphery has hook-shaped mold recesses into which plastic material is pressed to fill the mold by a first extruder means. Excess plastic material on the outer peripheral side of the molding roll is removed by a cutting removal device technically referred to as a doctor blade. By a second extruder located downstream in the production direction, the support part material is then applied and permanently connected to the hook-shaped fastener elements during the cooling process of the roll. A stripper roll then removes the finished fastener element from the mold. Due to the hook geometry, difficulties can arise during the mold removal process. Furthermore, a relatively high proportion of plastic scrap is formed in the production process due to use of the doctor blade.

WO 2006/099000 A2 discloses spraying a belt-like conveyor device on its upper strand side with droplets of plastic material. The plastic material is molded based on its surface tension into hemispherical shell bodies. Then bodies are permanently connected on their arching tops to a belt-like support part with the formation of a touch fastener element. In a development of this solution it is also possible, in the manner of thickened stem parts, to supply a belt-like support part which on its top bears grain-shaped agglomerates as the stem parts onto which the hemispherical head parts can then be placed. The touch fastener element produced in this way and designed to be used in particular as a fastener for baby diapers or incontinence diapers is, however, made relatively stiff and leaves much to be desired with respect to the fastener characteristics.

US 2006/0220271 A1 discloses a comparable solution calling for a molding tool in the form of a molding roll with the corresponding mold recesses instead of a belt for production of hemispherical fastener elements. Production of stem parts between the head parts and support part is not done with this known solution.

U.S. Pat. No. 5,785,784 discloses a production method for producing a belt-like support part bearing a plurality of projecting stem parts. In a downstream production step, the free stem ends are heated and then thicken as a result of the surface tension of the plastic material, in particular into a hemispherical head part. If, in a continuation of the known solution, the head parts produced in this way can be reshaped by a calander rolling method. Widened head part geometries are then formed which, with respect to the low material charge, are made relatively small and are widened in the direction of the earlier rolling direction.

DE 693 11 107 T2 discloses a generic method for producing a plastic touch fastener element with a base as a support part and with several stem parts, each having a proximal end projecting from the support part and a distal end provided with a head part, with the following method steps:

a) providing a permanent support part mold as a first molding tool for molding the support part of the touch fastener element;
b) providing a non-permanent stem part mold as a second molding tool with several passages for molding the stem parts; and
c) providing a permanent head part mold as the third molding tool with several cavities for molding the head parts; and
d) attaching the non-permanent stem part mold to the support part mold such that the passages of the stem part mold are in a fluid connection to the cavity of the support part mold and attaching the head part mold to the non-permanent stem part mold such that the cavities of the head part mold are in a fluid connection to the passages of the nonpermanent stem part mold.

By injecting a suitable molten plastic into the three molding tools in conjunction with curing of the plastic, a plastic touch fastener element is formed. By separation of the head part mold from the support part mold together with removing the non-permanent stem part mold, the touch fastener element removed from the mold in this way is present as a commercial product. The known solution moreover relates to a molding device characterized by three different molding tools and formed from the permanent support part mold, the permanent head part mold and the nonpermanent stem part mold. Due to the plurality of individual molds that must be made available and that must be handled in the production process, a certain preparation and production effort is necessary.

SUMMARY OF THE INVENTION

An object of the invention is to provide a further improved production method and apparatus with especially at low production costs forming a reliable touch fastener element that can be adjusted in wide ranges in terms of its fastening behavior.

This object is achieved by a method 1 and a device according to this invention.

The method according to the invention is characterized in that the head parts of the touch fastener element are formed free of a molding tool as a result of the surface tension of the plastic material used. Since the head parts can be formed by themselves during the solidification process, an independent expensive molding tool for forming the head parts, as is shown in the prior art, can be completely omitted. The method can also be carried out very efficiently since only two molding tools need be managed.

On the one hand, it is possible by injecting or pouring plastic material into a molding tool to first produce the support part as the base of the touch fastener element, and then to introduce the molding tool for the stem parts as a lost mold by the pertinent molding tool being placed on the top of the support part in in another process step to deliver the stem parts into the cavities or mold recesses of the molding tool as a lost mold. A certain material excess for each stem part projects over the assigned cavity of the lost mold to then allow the head part itself to be formed as a result of the surface tension of the material used. For the separate attachment step of the stem part together with the head part, the plastic material of the support part can be made already cured or only partially cured. After molding the stem parts in the assigned molding tool, and after automatic molding and curing of the head parts on its free flat top, the molding tool can then be withdrawn from the then cured stem parts, and the touch fastener element is then finished. By making the molding tool for the stem parts as a lost mold, an economical alternative is devised which, compared to other solid molding tools for touch fastener elements, allows a more efficient production process.

In one alternative preferred embodiment of the solution according to the invention, a suitable liquid plastic material can be placed in the permanent molding tool as part of the molding device with the formation of an immersion bath, in particular injected, to then press the nonpermanent molding tool with its mold recesses for the stem parts from overhead into this immersion bath. Preferably, actuators suitable for this purpose partially introduce the stem part molding tool in the immersion bath. The still liquid or partially plasticized plastic material then rises, viewed in the vertical direction, through the mold recesses of the molding tool made as a lost mold and forms the stem parts in doing so. If the molding tool is pressed still further into the immersion bath, plastic material is then displaced up out of the mold recesses so that the excess plastic material collects on the top of the molding tool for the stem parts and as a result of surface tension the dome-shaped or hemispherical head parts in turn then form automatically. After curing of the touch fastener element then again, as already shown, the molding tool for the stem parts is removed as a lost mold, and the touch fastener element is completed for its further use and can be removed from the molding device.

The two molding tools being used at the time form a stationary molding tool for the support part and a lost mold for the stem parts. Preferably, the two molding tools are made in the manner of injection molding tools which can be economically implemented and which increase the process reliability with respect to its mechanically simple structure. If in the prior art the known production devices of complex structure can be accurately, triggered with respect to temperature, this requirement is no longer necessary with the method according to the invention. This advantage in turn helps cut production costs and reduces the total price of the finished touch fastener product.

With the method according to the invention, demanding plastic materials such as acrylate material can also be used for the entire touch fastener element or parts of it. In particular, in the initially described two-stage process, for example, the support part can be produced from an acrylate material and the stem parts to be attached together with the head parts themselves produced could be of a thermoplastic material so that a relatively strong support would be achieved with the fastener elements themselves in the form of the respective stem part together with the pertinent head part made correspondingly flexible for good bottom engagement of the corresponding touch fastener element, whether in the form of loop material or in the form of mushroom-like interlocking elements.

The molding device according to the invention for carrying out the production process is made in the manner of an injection molding tool and has a corresponding mold recess for inserting the film-like molding tool which accordingly molds the stem parts of the touch fastener element. The other molding tool is preferably made modular so that worn components can be easily replaced by new ones. The film-like molding tool is made at any rate as a lost part to be replaced again. This arrangement has the advantage that with respect to the thin stem cross sections a new molding tool is always available again to improve the reproduction accuracy for the desired stem cross sections.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
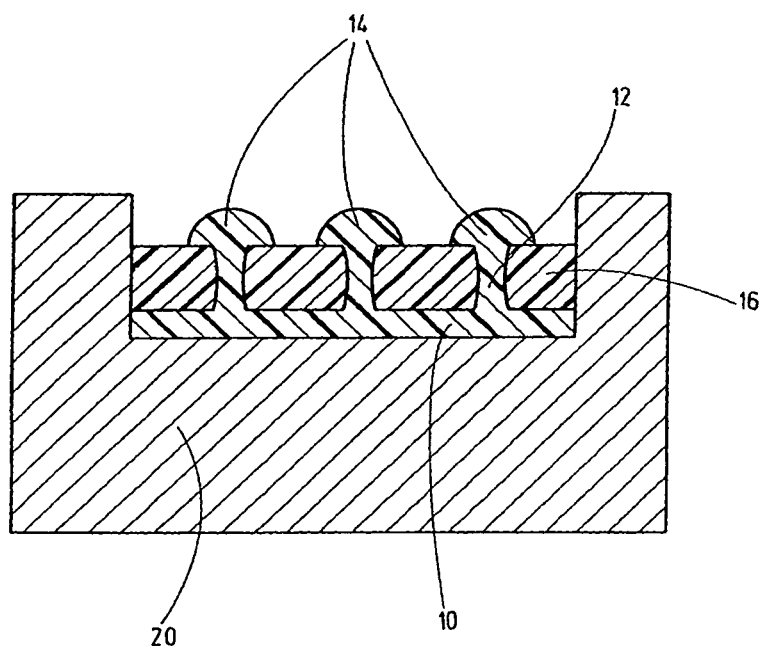
FIG. 1 is a side elevational view in section of a molding device according to an exemplary embodiment of the invention.

The method according to the invention is used to produce a plastic touch fastener having a belt-like support part 10 from which a plurality of stem parts 12 project. On each stem part end opposite or remote from the support part 10 one head part 14 is provided. For the sake of simplicity, the figures illustrate a touch fastener element with a total of six fastener elements, each consisting of a stem part 12 with a head part 14 which are paired next to one another in rows of three. This yields a touch fastener element with an almost square support part as the support belt 10. In an expansion of the arrangement, depending on the type of molding devices used at the time, any number of fastener elements can be devised for a touch fastener element. Furthermore, spherical molds as head parts 14 are disclosed and are formed with the surface tension of the plastic material used by itself when the plastic cools or solidifies.

The method according to the invention is characterized in that for molding of the stem parts 12 a molding tool 16 is used extending between the support part 10 and the head parts 14 according to the representation of the molding tool as shown in FIG. 1. After molding the stem parts 12, the molding tool 16 is removed in a separate mold removal process. The molding tool 16 can be, for example, a thermoplastic film which in the cold state forms stable mold recesses 18 for the stem parts 12 to be molded and which is heated for removal from the mold such that in the elastic state it can be withdrawn from the molded stem parts 12 with the head parts 14. The thermoplastic film can be preferably one of low density polyethylene (LDPE) material. In this exemplary embodiment, as shown in the figures, the mold recesses 18 viewed in cross section are made round so that cylindrical stem parts 12 are formed. However, other cross sectional shapes would be conceivable depending on the geometry of the mold recesses 18, for example, for obtaining stem parts 12 with a polygonal cross section or oval cross section.

The length of the stems 12 is oriented in turn to the thickness or to the insertion height of the film forming the molding tool 16 that in the cold state can be made rigid. It can also be a flexible film. In particular, thermoplastic LDPE film in the cold state is suitable for an injection molding process in which the touch fastener element is produced by injection molding. For removal from the mold the film should be heated to a value (for example, 80°) until it is stretchable, such that it can be withdrawn from the finished fastener element without damaging it and especially without tearing the heads 14 off. The withdrawn molded film as a molding tool 16 could then be delivered again to an extruder (not shown) to generate a new molding tool 16 again. The film can also be extruded as a whole and could then be perforated accordingly to form the mold recesses 18 for the stem parts 12.

The molding tool 16 could also be a film which can be chemically, thermally or biologically dissolved. In turn, it should form stable mold recesses 18 in the actual mold state and could then be dissolved for removal from the completely molded stem parts 12 by means of a solvent. For a film dissolving in this way especially a water-soluble film formed from gelatin materials or polyvinyl acetate would be feasible. The plastic materials for the actual touch fastener element can be thermoplastics, for example, polyamide, polypropylene or polyethylene. Preferably the touch fastener element is formed from a UV-cross linkable acrylate material resulting in an especially resistant, durable fastener material.

Figure 2:
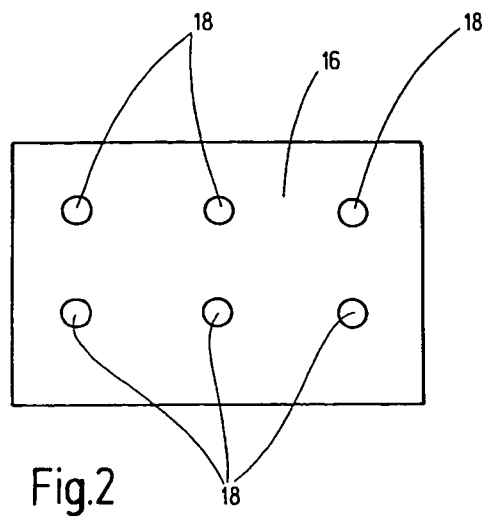
FIG. 2 is a top view of part of the molding device as of FIG. 1.
Figure 3:
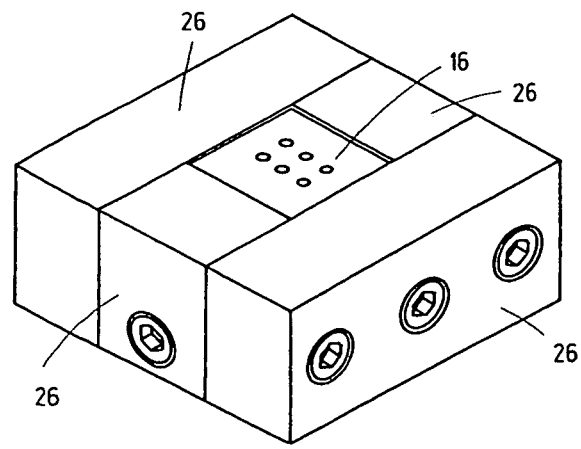
FIG. 3 is a perspective top view the modular molding device as of FIG. 1 in the assembled state.

The molding device shown in FIGS. 1 and 2 is detailed in FIG. 3, in particular, is designed as an injection molding tool. Together with the molding tool 16 designed as an insert part, the molding device has another molding tool or molding device 20 which can be modularly assembled from individual base blocks. Thus, underneath the molding tool 16 designed as an insert part, a square mold block has a concave mold depression for molding the rectangular support part 10. The molding tool 16 is placed congruently relative to the common longitudinally axes over this mold block. This combination is then assembled from four holding blocks 26 screwed against one another and to the mold block.

This composite block of individual holding blocks 26 with the insert part 16 can also be arranged in the manner of a peripheral belt in a row repeatedly in succession and/or next to one another so that mass production could be done as well as production of larger touch fastener elements with a plurality of fastener elements greater than six. In order to achieve a stable molding device combination for injection molding, preferably aluminum material is used for the molding device and for its components. For perforating the molding tool 16, a water jet cutting process (not detailed) can be used. Furthermore, to thoroughly harden the acrylate plastic for the touch fastener element, a thermal device (not shown) can be used or UV crosslinking can be employed.

Furthermore, injector nozzles (not shown) can fill the mold recess within the molding tool 20, as viewed in the direction of FIG. 1, from underneath with a type of plastic material to then in a downstream production step introduce a different plastic material for the stem parts 12 and the support part 10 from the top. In this way, the support part 10 can be made from especially hard acrylate material and the stem parts 12 together with the head parts 14 could be formed of a different thermoplastic material. In the reverse case, the stem parts and the head parts 12, 14 could be formed from hard acrylate material.

In the embodiment as shown in FIG. 1, a suitable liquid plastic material is first placed in a mold cavity in the molding device 20 with the formation of a type of immersion bath, in particular injected. Viewed in the direction of FIG. 1, the molding tool 16 with its mold recesses 18 is pressed on from overhead with a suitable actuator (not shown). The still liquid or partially plasticized plastic or flowable material then rises through the mold recesses 18 of the molding tool 16 toward the top viewed in the direction of FIG. 1. In this way, the stem parts 12 are formed. The excess plastic material then collects on the flat top of the molding tool 16 and, as a result of the surface tension, hemispherical head parts 14 form in this way. After curing of the touch fastener element, the molding tool 16 is removed as a lost mold.

The indicated film as the molding tool 16 can be formed of an elastomer material such as silicone, and can have, in particular, elastic properties. A thin-walled aluminum foil can also be used as the molding tool 16 and can be torn or cut for the process of removal of the touch fastener element from the mold. Elastically flexible gauze solutions are also conceivable and can remain on the touch fastener element depending on its definable elasticity. The elastically flexible material, in particular gauze material, is compressed along the longitudinal axis of the respective stem part 12, for example, by pressing a corresponding touch fastener element onto the foil. In this way, between the top of the remaining foil and bottom of the head part material a gap can still remain which the respective interlocking part of the corresponding touch fastener element can engage by interlocking.

If the molding tool 16 is provided on its top with the corresponding geometries, for example, in the form of dome-shaped recesses (not shown) a solid spherical head can also be obtained as the head part 14. If a concentric enclosure edge (not shown) is introduced into the top of the molding tool 16 to the respective longitudinal axis of the stem, plastic material displaced in the solidification process can penetrate into the pertinent mold groove so that on the bottom of the head part 14 formed at the time has an annular projection help improve the interlocking situation for the overall touch fastener. In this respect, a plurality of possibilities for shaping the respective head part 14 on its bottom adjacent to the molding tool 16 is available. Various configuration possibilities for a touch fastener element with only one molding tool 16 from the bottom are obtainable.

While one embodiment has been chosen to illustrate the invention, it will be understood by those in the art that various changes and modifications can be made therein without departing from the scope of the invention as defined in the appended claims.

What is claimed is:

1. A method for producing an adhesive fastener, comprising the steps of:

molding stem parts on a support part in a mold with a molding tool extending between the support part and ends of the stem parts remote from the support part;

forming a head part on each of the ends of the stem parts remote from the support part free of molding tools as a result of surface tension of plastic material used to form each head part; and removing the molding tool from the mold and after molding of the stem parts in a mold removal process.

2. A method according to claim 1 wherein
the molding tool is a thermoplastic film having a cold state forming stable mold recesses molding the stem parts therein; and
the molding tool is heated to an elastic state for removal from the mold and from the stem parts with the head parts that have been formed.

3. A method according to claim 2 wherein
the thermoplastic film is a low density polyethylene film.

4. A method according to claim 1 wherein
the molding tool is a film being chemically, thermally or biologically dissolvable, having a mold state forming stable mold recesses for the molding of the stem parts therein, and being dissolved for removal of the stem parts after molding thereof by application of a solvent.

5. A method according to claim 4 wherein
the film is water solvable and is formed of gelatin or polyvinyl acetate.

6. A method according to claim 1 wherein
the molding tool includes recesses in which the stem parts are molded and a top surface surrounding the recesses on which the head parts are molded and have upper surfaces remote from the stem parts formed solely by surface tension of the plastic material of the head parts without contacting a mold surface.

7. A method according to claim 6 wherein
the top surface is generally flat.

8. A method according to claim 6 wherein
flowable plastic material is placed in the mold; and
the mold tool is pressed from overhead into the mold and the flowable plastic material such that the flowable plastic material rises through the recesses to mold the stem parts and excess flowable plastic material collects of the top surface of the molding tool to form the head parts by the surface tension thereof.

9. A molding device for producing an adhesive fastener, comprising:
a first mold tool having a mold cavity therein; and
a second mold tool placed within said cavity with a support part for the adhesive fastener located between a bottom of the mold cavity and the second mold part, with stem parts of the adhesive fastener extending from the support part through the second mold tool, and with head parts on ends of the stem parts remote from the support part formed by surface tension of plastic material forming the head parts, and second mold tool being a film.

10. A molding device according to claim 9 wherein
said first mold tool is an injection molding tool.

11. A molding device according to claim 9 wherein
the cavity in the first mold tool having a depth at least equal to a sum of heights of the support parts and each of the stem parts.

12. A molding device according to claim 11 wherein the cavity has a flat bottom to form the support part.

13. A molding device according to claim 9 wherein
the second mold tool is a thermoplastic film having a cold state forming stable mold recesses for molding the stem parts, and is heatable to an elastic state for removal from the mold and from the stem parts with the head part formed thereon.

14. A molding device according to claim 13 wherein the thermoplastic film is a low density polyethylene film.

15. A molding device according to claim 9 wherein
the film is chemically, thermally or biologically dissolvable, has a mold state forming stable mold recesses for molding of the stem parts and has a dissolved state for removal of the stem part with the head parts thereon.

16. A molding device according to claim 15 wherein
the film is water solvable and is formed of polyvinyl acetate.

17. A molding device according to claim 9 wherein
the molding tool includes recesses in which the stem parts are molded and a top surface surrounding the recesses on which the head parts are molded and have upper surfaces remote from the stem parts formed solely by surface tension of the plastic material of the head parts without contacting a mold surface.

18. A molding device according to claim 17 wherein
the top surface is generally flat.

\* \* \* \* \*